Dec. 8, 1931.  R. H. RUSSELL  1,834,970
CUTTING OR SCORING MACHINE
Filed May 26, 1928  3 Sheets-Sheet 3
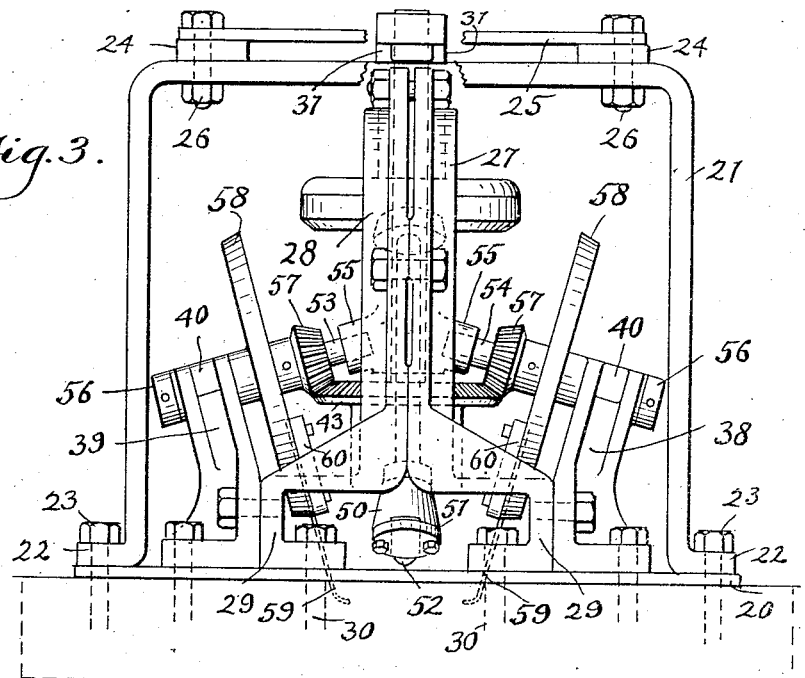
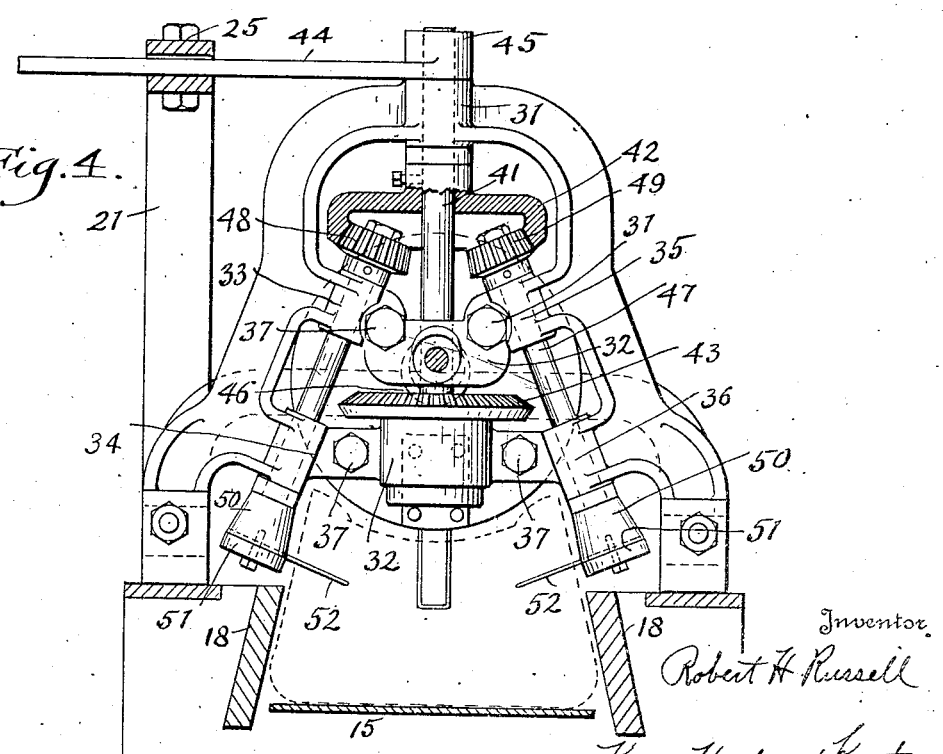

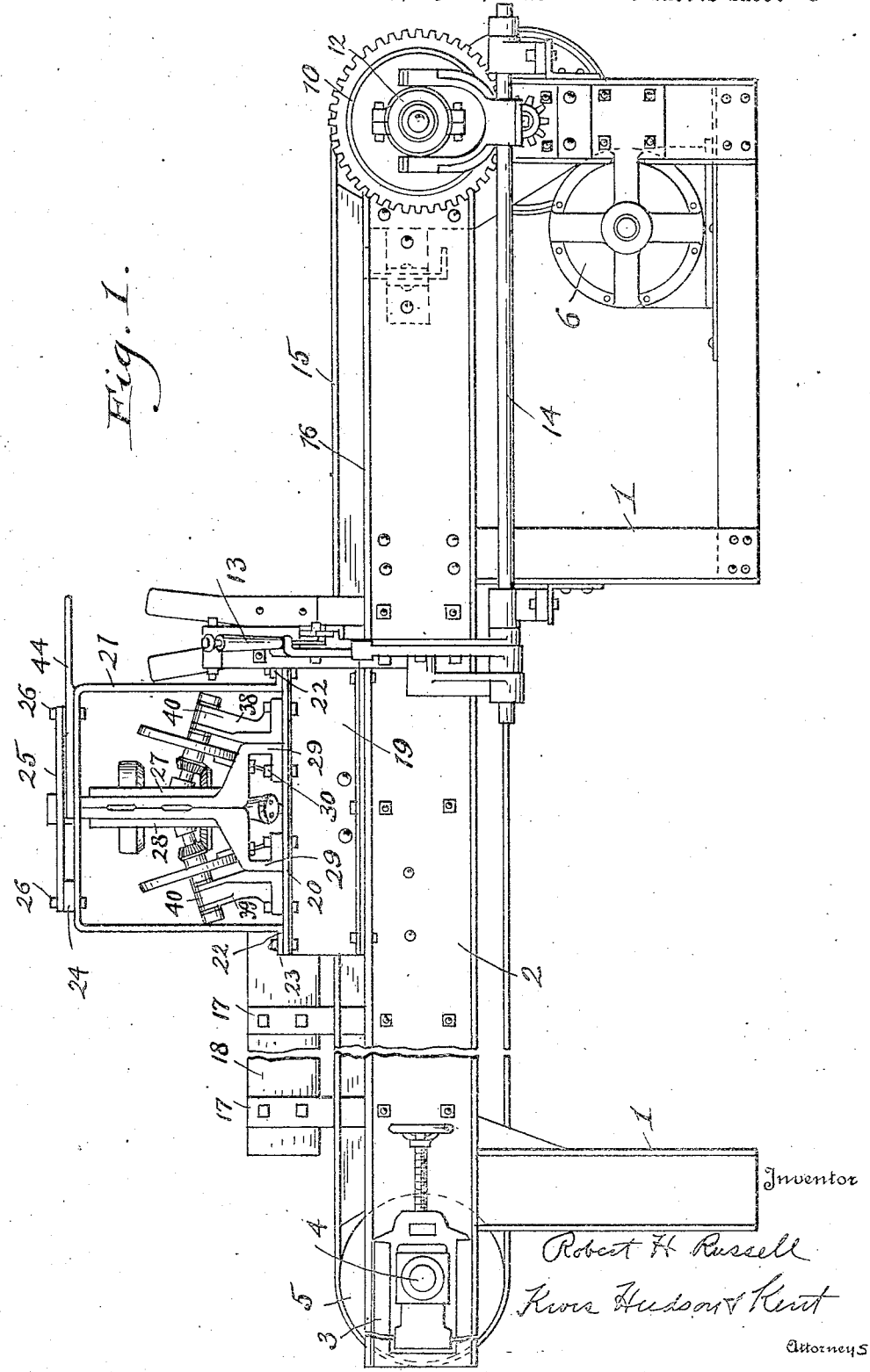

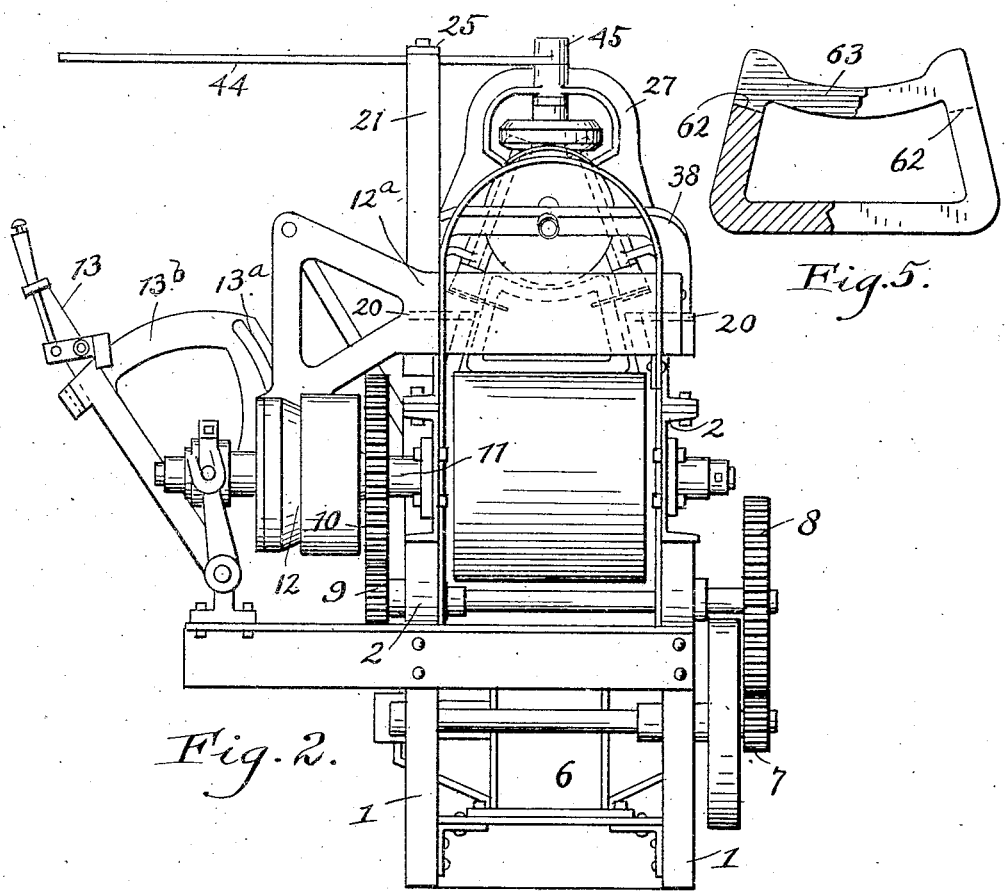
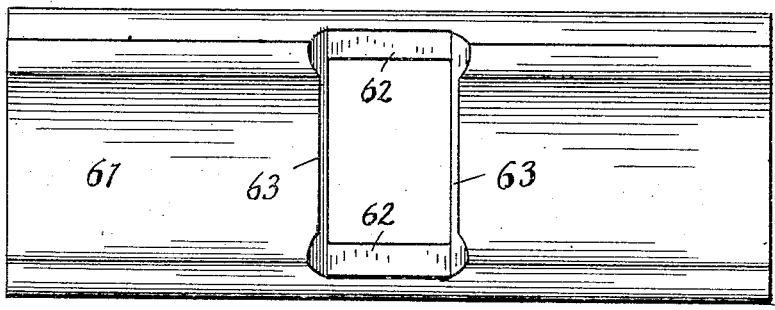
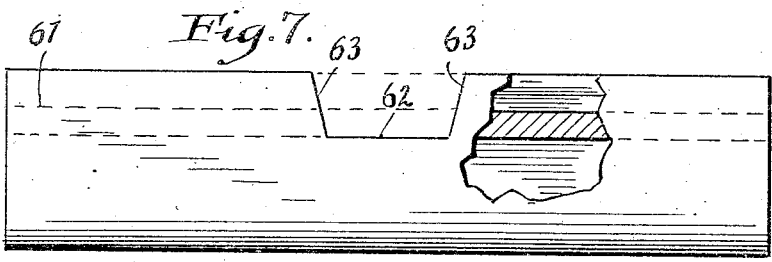

Patented Dec. 8, 1931

1,834,970

UNITED STATES PATENT OFFICE

ROBERT H. RUSSELL, OF AKRON, OHIO, ASSIGNOR TO THE RIC-WIL COMPANY, OF CLEVELAND, OHIO, A CORPORATION OF OHIO

CUTTING OR SCORING MACHINE

Application filed May 26, 1928. Serial No. 280,825.

This invention relates to a cutting or scoring machine, and has particular utility in connection with the manufacture of certain clay products, although not limited alone to such use.

In order to describe a definite embodiment of the invention and a particular use to which it is especially adapted, the description herein will treat of the machine in connection with the production of a hollow clay conduit or tile used as a base support for underground pipes.

Underground pipes used in the transmission of steam, hot water, or other liquid or gaseous materials, should be supported upon a suitable base, ordinarily in the form of a hollow drain tile or conduit having an opening provided in its upper side intermediate its ends to accommodate the enlarged annular connecting portions of the pipes. These openings are formed in the tile by cutting a plug or section out of the upper middle part thereof while the tile is "green." However, it was found that when the plug was cut entirely out of the "green" tile that the subsequent baking operation resulted in the remaining parts of the tile contracting and expanding unevenly. This brought about the practice of cutting the plug from the tile and then fastening the same in its original position by means of pins, so that its expansion and contraction during baking and cooling would be uniform throughout the tile.

An object of the invention is to provide a cutting or scoring machine wherein a plurality of cutting or scoring elements may be actuated by a common operating means so as to function in a plurality of different prescribed planes.

A more specific object is to provide a machine capable of cutting or scoring the walls of a tile or conduit in such manner that a plug may be cut entirely loose therefrom, or partially loose therefrom, so as to have portions remaining attached thereto whereby contraction or expansion of the tile during baking will be uniform.

Another object is to provide a machine capable of uniformly and economically cutting plugs from a tile.

Another object is to provide a cutting or scoring machine formed of a relatively few number of parts, and of simple and economic construction.

Other objects and advantages will become apparent as the detailed description progresses.

An embodiment of the invention is illustrated in the accompanying drawings, wherein—

Fig. 1 is a side elevational view of the machine mounted on a belt conveyor frame;

Fig. 2 is an end elevational view of the machine also mounted on the belt conveyor frame;

Fig. 3 is a side elevational view of the machine, a tile or conduit being shown by dash lines in position for cutting out the plug;

Fig. 4 is an end elevational view of the machine, certain parts being indicated in section and a tile being shown by dash lines; and Figs. 5, 6 and 7 are end, top and side views, respectively, of the tile, with the plug entirely removed and portions of the tile shown in section.

In the drawings and throughout the specification like numerals will refer to like parts.

The machine is shown, and will be described, as mounted upon the frame of a belt conveyor, although the conveyor, as well as its driving motor, form no part of the present invention, since the machine may be otherwise mounted and used.

The conveyor frame comprises vertical supporting legs 1 having the spaced parallel longitudinally extending frame members 2 secured to their upper ends. The rear end of the members 2 is provided with openings within which are arranged the take up boxes 3. These boxes adjustably house bearings for the shaft 4 which carries the pulley 5. A drive motor 6 is located adjacent the front end of the conveyor, being operatively connected through a train of gears 7, 8, 9 and 10 with the shaft 11 which carries the forward pulley of the conveyor mechanism. A suitable clutch mechanism 12 operable by the lever 13 through the shaft 14 enables the conveyor belt to be stopped or started at will, while a pivoted transversely extending plate 12a operatively connected with a slot 13a arranged in a segment arm 13b carried by the lever is positioned in or removed from the path of the articles upon the conveyor belt upon actuation of the lever 13. The conveyor belt 15, of course, extends around the rear and forward pulleys.

A filler member 16 is arranged between the upper edges of the members 2 and the belt 15, so that the tiles will be firmly supported as they are carried by the belt through the cutting machine. Vertically extending arms 17 are connected to the members 2 and carry longitudinally extending guides 18, for the tiles. These guides are shaped on their inner sides to conform to the shape of the tiles.

The description thus far having dealt entirely with the conveyor and the frame therefor has been made as brief as possible, since it includes no part of the present invention, except as it is combined with the cutting machine. It should thus be understood that the details such as cross braces and other parts have not been specifically referred to, since their construction is conventional and well understood in the art.

Secured upon the upper edges of the frame members 2 and just rearwardly of the clutch operating lever 13 are the channel bars 19 which support the cutting or scoring machine. These bars are of such height that the cutting elements of the machine will be in substantially the proper position with respect to the tile arranged on the conveyor. A plate 20 is arranged on the upper flange of each of the channel bars 19 and forms a part of the means for attaching the machine to the conveyor.

A substantially U-shaped frame member 21 having feet portions 22 bearing upon the plate 20 is attached by the bolts 23 to the channel bar 19 located on the side of the conveyor with the clutch operating lever. The frame member 21 has spaced spacing blocks 24 secured to its web portion between which extends the plate 25. The frame member 21, spacing blocks 24 and plate 25 are connected together by the bolts 26. The purpose of this construction is to guide and limit the movement of the operating handle of the machine and thereby the length of the circumferential travel of the cutting elements, all as will be more fully explained hereinafter.

A supporting and bearing forming frame for the structural operative elements of the machine is made up of two complementary parts 27 and 28, the line of separation between the two parts being the transverse, vertical center line of the combined frame. Each of the parts 27 and 28 is provided at its lower ends with attaching foot portions 29 by which they are secured by means of the bolts 30 to the channel bars 19 on each side of the machine. The parts are also formed with complementary bearing portions 31, 32, 33, 34, 35 and 36, the purpose of which will be more fully explained hereinafter. Bolts 37 secure the two parts of the frame together, such bolts being provided when and in such numbers as is desirable.

Transversely extending frame members 38 and 39 are secured to the channel bars 19 and to the foot portions 29 of the frame members 27 and 28, by cap screws or other suitable securing means. The frame members 38 and 39 are each provided with a bearing portion 40.

A main driving shaft 41 is vertically supported in the bearings 31 and 32 formed by the complementary frame members 27 and 28. The shaft 41 has an internal toothed gear 42 rotatably fixed therewith and arranged just below the bearing 31. A bevel gear 43 is fixed on the shaft 41 between the two bearings 32. The shaft 41 is actuated by means of a handle 44 having an enlarged boss 45 at its inner end fitting over the upper end of the shaft above the bearing 31 and pinned, keyed, or otherwise secured thereto. The handle 44 extends between the plate 25 and the web portion of the frame 21 so that its outer end lies beyond such parts and is adjacent to the clutch operating lever 13. The spacing blocks 24 limit the movement of the handle and determine the length of the circumferential travel of the cutting elements, as will be more fully explained hereinafter.

The bearings 33, 34 and 35, 36 form the supports, respectively, for rotatable shafts 46 and 47. These shafts are provided at their upper ends with pinions 48 and 49, respectively, which mesh with and are driven by the internal gear 42. The lower ends of the shafts carry attaching members 50 to which are adjustably secured, by means of clamping plates 51, steel cutting or scoring knives 52.

The bearings 40, formed by the transversely extending frame members 38 and 39, rotatably support shafts 53 and 54, respectively. It should be noted that these shafts are supported at their outer ends by the bearings 40, while their inner or upper ends are rotatably housed in bearings 55 furnished by the frame members 27 and 28. A set collar 56 is arranged on the outer and lower end of the shafts 53 and 54 holding them against axial movement. Pinions 57 are fixed to the shafts between the bearings, being located so as to mesh with and be driven by the bevel gear 43. A disc 58 is fixed to each of the shafts 53 and 54, respectively, between the pinions 57 and the bearings 40, and has a cutting or scoring knife 59 adjustably secured thereto by means of a clamping plate 60.

The foregoing description makes it clear that when the handle 44 is moved in either direction between the spacing blocks 24 the shaft 41 is rotated in its bearings. Of course, this rotation of the shaft 41, in turn, rotates the internal gear 42 and the bevel gear 43. The internal gear drives the shafts 46 and 47 through the pinions 48 and 49, thereby causing the cutting or scoring knives to be swung through an arc. In a like manner, the bevel gear 43 drives the shafts 53 and 54 through the pinions 57, whereupon the cutting or scoring knives 59 are also swung through an arc. It should be noted that the shafts 46, 47, 53 and 54 are angularly arranged with respect to the main shaft 41 and the plane of the upper side of the conveyor belt. This angular arrangement of the shafts provides the approximate taper which the cutting knives are to impart to the cut edges of the tile. Since the cutting knives are longitudinally adjustable, their lengths may be varied to change their arcs of travel, thereby diminishing or increasing the chord of such arcs and hence the length of the straight line cut. The distance between the spacing blocks 24, the ratio between the gear elements, and the angular arrangement of the shafts are all predetermined to the end that the knife adjustment will take care of any desired changes in the character of the cut, to suit different sizes of tiles as may be passed through the machine. It should also be observed that the machine is double acting, so to speak, since a forward movement of the operating handle will cause the cutting knives to rotate in one direction while a backward movement of the handle will cause them to rotate in the opposite direction, either of which movements will produce the same cutting results of the knives.

The operation of the machine is as follows:

The tiles 61 are placed on the conveyor belt 15, either manually or automatically, as desired, and are carried forwardly thereby between the guides 18. As each tile comes into the proper cutting position the operator, by means of the clutch operating lever 13, stops the movement of the conveyor belt and at the same time the plate 12a is positioned in the path of the tile and maintains the same in the proper cutting position. The handle 44, which is at one extreme of the space between the blocks 24, is then swung by the operator to the other extreme position. This movement of the handle causes the knives 52 to swing through a predetermined arc and effect the longitudinal cutting of the tile 61 along the lines 62. At the same time the knives 59 are swinging through their predetermined arc and are effecting the transverse cutting of the tile along the lines 63. After the handle 44 has reached its limit of travel, the operator throws the lever 13 to actuate the clutch and start further movement of the conveyor belt and to remove the plate 12a from the path of the tiles. The cut tile 61 is carried away from the cutting machine and an uncut one brought into cutting position, whereupon the operator again stops the movement of the conveyor and moves the operating handle 44 to its other extreme position. This operation is repeated in the same manner as the following tiles are consecutively brought into cutting position, it only being necessary, however, to move the handle in one direction for each cutting operation depending upon its position.

As previously pointed out, the longitudinal adjustment of the cutting knives determines the character of the cut effected thereby. If it is desired to have a clean cut the knives may be adjusted to that end, or they may be so arranged that the tile will be simply scored thereby. Preferably, the knives are so adjusted that the longitudinal and transverse cuts will be clean for the greater part of their lengths but will be simply scored adjacent their meeting extremities. The tile may thus be cut while "green" without completely removing the plug. After the baking and cooling of the tile the plug may be readily knocked out. Therefore, expansion and contraction of the tile is kept uniform during these operations.

The knives 52 may also be adjusted axially of the shafts 46 and 47 by means of shims between the knives and the members 50. However, these knives must always be located above the upper edge of the guides 18.

Although a preferred embodiment of the invention has been disclosed, it should be understood that the invention is not limited thereto, but that it is susceptible of such modifications and adaptations as fall within the scope of the appended claims.

Having thus described my invention what I claim is:

1. A cutting or scoring machine comprising a plurality of cutting or scoring knives arranged for arcuate movement in different angularly disposed planes, and means for simultaneously operating said knives.

2. A cutting or scoring machine comprising a plurality of cutting or scoring knives arranged in different angularly disposed planes to move through eccentric arcs and adjustable so as to move through different arcs, and means for simultaneously operating said knives.

3. A cutting or scoring machine adapted to be used in connection with a conveyor mechanism, comprising a plurality of rotatable means angularly disposed with respect to each other, knives attached to each of said rotatable means so as to be adjustable radially thereof, and a common means for simultaneously rotating all of said rotatable means.

4. A cutting or scoring machine adapted to be used in connection with a conveyor mechanism comprising a shaft, means for rotating said shaft, a plurality of shafts angularly disposed with respect to said first named shaft and adapted to be rotated therewith, and knives adjustably mounted radially of each of said last named shafts adapted to swing through arcs during rotation of the shafts.

5. A cutting or scoring machine adapted to be used in connection with a belt conveyor mechanism comprising a frame adapted to be secured to the conveyor above and adjacent to the upper side of the belt thereof, a shaft rotatably mounted in said frame, a plurality of shafts angularly disposed with respect to said first named shaft, means operatively associating said last named shafts with said first named shaft, a knife carried by each shaft of said plurality of shafts and adjustable radially thereof, and means for rotating said first named shaft a predetermined amount, whereby said knives will swing through predetermined arcs.

6. A cutting or scoring machine adapted to be used in connection with a belt conveyor mechanism comprising a frame adapted to be secured to the conveyor above and adjacent to the upper side of the belt thereof, a shaft rotatably mounted in said frame, a plurality of gears fixed to said shaft, a plurality of shafts angularly disposed with respect to said first named shaft each having a gear meshing with one of the gears carried by said first named shaft, a knife carried by each shaft of said plurality of shafts and adjustable radially thereof, and means for rotating said first named shaft a predetermined amount, whereby said knives will swing through predetermined arcs.

7. A cutting or scoring machine adapted to be used in connection with a belt conveyor mechanism comprising a frame adapted to be secured to the conveyor above and adjacent to the upper side of the belt thereof, a shaft rotatably mounted in said frame, means for rotating said shaft, means for limiting the amount of rotation of said shaft, a plurality of shafts angularly disposed with respect to said first named shaft, means operatively associating said last named shafts with said first named shaft, and a knife carried by each shaft of said plurality of shafts and adjustable radially thereof.

8. A cutting or scoring machine adapted to be used in connection with a belt conveyor mechanism comprising a frame adapted to be secured to the conveyor mechanism above and adjacent to the upper side of the belt thereof, a shaft rotatably mounted in said frame, a plurality of shafts also mounted in said frame and operatively associated with said first named shaft, a second frame secured to the conveyor mechanism and to said first named shaft, a plurality of shafts mounted in said second frame and operatively associated with said first named shafts, a knife carried by each shaft of each plurality of shafts and adjustable radially thereof, and means for operating said first named shaft to operate each plurality of shafts and thereby swing the knives through an arc.

9. A cutting or scoring machine adapted to be used in connection with a belt conveyor mechanism comprising a frame adapted to be secured to the conveyor mechanism above and adjacent to the upper side of the belt thereof, a shaft rotatably mounted in said frame having a plurality of gears fixed thereto, a plurality of shafts also mounted in said frame, each having a gear meshing with one of the gears carried by said first named shaft, a second frame secured to the conveyor mechanism and to said first named shaft, a plurality of shafts mounted in said second frame each having a gear meshing with another of the gears on said first named shaft, a knife carried by each shaft of each plurality of shafts and adjustable radially thereof, a handle for rotating said first named shaft, and means for limiting movement of said handle.

10. In combination with a conveyor mechanism having an endless belt, a drive means therefor, and a clutch mechanism for rendering said drive means operative and inoperative, a cutting or scoring machine comprising a plurality of cutting or scoring knives arranged in different angularly disposed planes above the belt of the conveyor, and means for simultaneously operating said knives.

11. In combination with a conveyor mechanism having an endless belt, a drive means therefor, and a clutch mechanism for rendering said drive means operative and inoperative, a cutting or scoring machine comprising a plurality of arcuately moving cutting or scoring knives arranged in different angularly disposed planes and adjustable so as to move through different arcs, and means for simultaneously operating said knives.

12. In combination with a conveyor mechanism having an endless belt and a drive mechanism therefor, a cutting or scoring mechanism comprising a shaft, means for rotating said shaft, a plurality of shafts operatively associated with said first named shaft, and a knife adjustably mounted radially of each of said last named shafts adapted to swing through arcs during rotation of the shafts.

13. In combination with a conveyor mechanism having an endless belt, a drive mechanism therefor, and a clutch for rendering said drive mechanism operative and inoperative, a cutting or scoring machine comprising a frame adapted to be secured to the conveyor mechanism above and adjacent the upper side of the belt thereof, a shaft rotatably mounted in said frame, a plurality of shafts operatively associated with said first named shaft, a knife carried by each shaft of said plurality of shafts and adjustable radially thereof, and means adapted to be operated when said clutch has rendered said drive means inoperative for rotating said first named shaft a predetermined amount, whereby said knives will swing through predetermined arcs.

14. A cutting or scoring machine comprising a plurality of arcuately movable cutting or scoring knives, means for operating said knives simultaneously to effect the cutting movement thereof, and means prescribing the amount of movement of the knives, said knives being operable in opposite directions between the limits of movement and capable of effecting their cutting operation in both directions of movement.

In testimony whereof, I hereunto affix my signature.

ROBERT H. RUSSELL.